(12) United States Patent
Hashemi et al.

(10) Patent No.: US 12,175,351 B2
(45) Date of Patent: Dec. 24, 2024

(54) COMPUTER SYSTEM PREDICTION MACHINE LEARNING MODELS

(71) Applicant: Google LLC, Mountain View, CA (US)

(72) Inventors: Milad Olia Hashemi, San Francisco, CA (US); Parthasarathy Ranganathan, San Jose, CA (US); Jamie Alexander Smith, Boston, MA (US); Kevin Jordan Swersky, Toronto (CA)

(73) Assignee: Google LLC, Mountain View, CA (US)

( * ) Notice: Subject to any disclaimer, the term of this patent is extended or adjusted under 35 U.S.C. 154(b) by 1366 days.

(21) Appl. No.: 15/994,144

(22) Filed: May 31, 2018

(65) Prior Publication Data
US 2019/0370632 A1 Dec. 5, 2019

(51) Int. Cl.
*G06N 3/044* (2023.01)
*G06N 3/047* (2023.01)
*G06N 3/063* (2023.01)
*G06N 3/08* (2023.01)

(52) U.S. Cl.
CPC ............ *G06N 3/044* (2023.01); *G06N 3/047* (2023.01); *G06N 3/063* (2013.01); *G06N 3/08* (2013.01)

(58) Field of Classification Search
CPC .... G06N 3/0445; G06N 3/0472; G06N 3/063; G06N 3/08
See application file for complete search history.

(56) References Cited

U.S. PATENT DOCUMENTS

| 5,305,389 | A | 4/1994 | Palmer |
| 9,471,314 | B1 | 10/2016 | Bonanno et al. |
| 9,977,865 | B1 | 5/2018 | Laborde |
| 10,437,718 | B1 * | 10/2019 | Anghel .................. G06N 20/00 |

(Continued)

FOREIGN PATENT DOCUMENTS

| JP | H10171653 A * | 6/1998 |
| JP | H10171653 A2 * | 6/1998 |

(Continued)

OTHER PUBLICATIONS

Nesbit, Kyle J et al. "Data cache prefetching using a global history buffer." 10th International Symposium on High Performance Computer Architecture (HPCA'04) (Year: 2004).*

(Continued)

*Primary Examiner* — Michael J Huntley
*Assistant Examiner* — Adam C Standke
(74) *Attorney, Agent, or Firm* — Fish & Richardson P.C.

(57) ABSTRACT

Methods, systems, and apparatus, including computer programs encoded on computer storage media, for pre-fetching data from memory using neural networks. One example system receives a sequence of prior program counter addresses of a computer program and corresponding delta values. The system creates an input representation based on the sequence. The system provides the input representation as input to a recurrent neural network. The system receives from the recurrent neural network an output that defines a probability distribution over future delta values. Each probability in the distribution represents a likelihood that execution of a future instruction of the computer program will cause data to be fetched from a particular future memory address.

20 Claims, 5 Drawing Sheets

(56) References Cited

U.S. PATENT DOCUMENTS

| | | |
|---|---|---|
| 2016/0381176 A1 | 12/2016 | Cherbini et al. |
| 2017/0168947 A1 | 6/2017 | Lesecq et al. |
| 2018/0143746 A1 | 5/2018 | Stern et al. |

FOREIGN PATENT DOCUMENTS

| | | |
|---|---|---|
| TW | I579694 | 4/2017 |
| TW | I608429 | 12/2017 |

OTHER PUBLICATIONS

Peled, Leeor et al. "Towards memory prefetching with neural networks: Challenges and insights." arXiv preprint arXiv:1804.00478 ( Year: 2018).*

Nesbit, Kyle Jet al. "Data cache prefetching using a global history buffer." 1oth International Symposium on High Performance Computer Architecture (HPCA'04) (Year: 2004).*

Mehta, Bhavesh et al. "Cache Showdown: The Good, Bad, and Ugly." Project Report, Computer Sciences Department, University of Wisconsin Madison (Year: 2004).*

Of Chtourou, Sofien et al. "A hybrid approach for training recurrent neural networks: application to multi-step-ahead prediction of noisy and large data sets." Neural Computing and applications 17.3 (Year: 2008).*

Zeng, Yuan Long Short Term Based Memory Hardware Prefetcher (Year: 2017).*

Luk, Chi-Keung et al. "Compiler-based prefetching for recursive data structures." Proceedings of the seventh international conference on Architectural support for programming languages and operating systems (Year: 1996).*

Hashemi, Milad, et al. "Learning memory access patterns." arXiv:1803.02329v1 (Year: 2018).*

Peled, Leeor, et al. "Semantic locality and context-based prefetching using reinforcement learning." Proceedings of the 42nd Annual International Symposium on Computer Architecture. (Year: 2015).*

Dai, Dong, et al. "Block2vec: A deep learning strategy on mining block correlations in storage systems." 2016 45th international conference on parallel processing workshops (ICPPW). IEEE (Year: 2016).*

Chtourou et al., "Neural Network Based Memory Access Prediction Support for SoC Dynamic Reconfiguration," 2006 International Joint Conference on Neural Networks, Jul. 16/21, 2006, Vancouver BC, Canada, 7 pages.

G. Ayers, et al., "Memory hierarchy for web search," HPCA-IS '18, 2018, 14 pages.

M. Ferdman, et al., "Clearing the clouds: A study of emerging scale-out workloads on modern hardware," ASPLOS XVII, 2012, 11 pages.

A. Gutierrez, et al., "Full-system analysis and characterization of interactive smartphone applications," in Workload Characterization (IISWC), 2011 IEEE International Symposium on, 2011, 10 pages.

M. Hashemi, et al., "Efficient execution of bursty applications," IEEE Computer Architecture Letters, 2016, 4 pages.

Y. Bengio, et al., "A neural probabilistic language model," Journal of machine learning research, vol. 3, No. Feb, pp. 1137-1155, 2003.

T. Mikolov, et al., "Distributed representations of words and phrases and their compositionality," in Advances in Neural Information Processing Systems, pp. 3111-3119, 2013.

R. Golla et al., "T4: A highly threaded server-on-a-chip with native support for heterogeneous computing," in Hot Chips 23, IEEE Computer Society Press, 2011, 21 pages.

D. A. Jiménez et al., "Dynamic branch prediction with perceptrons," pp. 197-206, 2001.

R. Shwartz-Ziv et al., "Opening the black box of deep neural networks via information," arXiv preprint arXiv:1703.00810, 2017, 19 pages.

C. Kozyrakis, et al., "Server engineering insights for large-scale online services," IEEE Micro, vol. 30, pp. 8-19, Jul. 2010.

S. Kanev, et al., "Profiling a warehouse-scale computer," in Proceedings of the 42nd Annual International Symposium on Computer Architecture, ISCA '15, 2015, 12 pages.

K. J. Nesbit et al., "Data cache prefetching using a global history buffer," in HPCA-10, 2004, 8 pages.

N. Jouppi, "Improving direct-mapped cache performance by the addition of a small fully-associative cache and prefetch buffers," in ISCA-17, 1990, 10 pages.

S. Palacharla et al., "Evaluating stream buffers as a secondary cache replacement," 1994.

A.-C. Lai, et al., "Dead-block prediction and dead-block correlating prefetchers," 2001, 11 pages.

S. Somogyi, et al., "Spatial memory streaming," in ISCA-33, 2006, 12 pages.

A. Roth, et al., "Dependence based prefetching for linked data structures," 1998.

D. Joseph et al., "Prefetching using Markov predictors," 1997, 12 pages.

A. Jain et al., "Linearizing irregular memory accesses for improved correlated prefetching," in MICRO-46, 2013, 13 pages.

A. Bhattacharjee, "Translation-triggered prefetching," in Proceedings of the Twenty-Second International Conference on Architectural Support for Programming Languages and Operating Systems, pp. 63-76, Apr. 2017.

E. Ipek, et al., "Self-optimizing memory controllers: A reinforcement learning approach," in ISCA-35, 2008, 27 pages.

R. D. Blanton, et al., "Statistical learning in chip (slic)," in Proceedings of the IEEE/ACM International Conference on Computer-Aided Design, pp. 664-669, 2015.

L. Peled, et al., "Semantic locality and context-based prefetching using reinforcement learning," in ISCA-42, 2015, 13 pages.

W. Zaremba et al., "Learning to execute," arXiv preprint arXiv:1410.4615, 2014, 25 pages.

I. Sutskever, et al., "Sequence to sequence learning with neural networks," in Advances in neural information processing systems, pp. 3104-3112, 2014.

A. Graves, et al., "Neural turing machines," arXiv preprint arXiv:1410.5401, 2014, 26 pages.

M. Balog, et al., "Deepcoder: Learning to write programs," International Conference on Learning Representations, 2017, 21 pages.

C. Maddison et al., "Structured generative models of natural source code," in International Conference on Machine Learning, pp. 649-657, 2014.

A. Hindle, et al., "On the naturalness of software," in International Conference on Software Engineering, pp. 837-847, IEEE, 2012.

M. White, et al., "Toward deep learning software repositories," in Mining Software Repositories, pp. 334-345, IEEE, 2015.

C. Cummins, et al., "Synthesizing benchmarks for predictive modeling," in CGO, IEEE, 2017, 14 pages.

C. Delimitrou et al., "Quasar: Resource-efficient and qos-aware cluster management," in Proceedings of the 19th International Conference on Architectural Support for Programming Languages and Operating Systems, pp. 127-144, Apr. 2014.

E. Cortez, et al., "Resource central: Understanding and predicting workloads for improved resource management in large cloud platforms," in Proceedings of the 26th Symposium on Operating Systems Principles, SOSP '17, pp. 153-167, Oct. 2017.

D. E. Rumelhart, et al., "Learning representations by back-propagating errors," Cognitive Modeling, vol. 5, No. 3, 4 pages, 1988.

S. Hochreiter et al., "Long short-term memory," Neural Computation, vol. 9, No. 8, pp. 1735-1780, 1997.

C. Olah, "Understanding LSTM networks." http://colah.github.io/posts/2015-08-Understanding-LSTMs/, Aug. 27, 2015, 12 pages.

I. Goodfellow, et al., Deep Learning. MIT Press, 2016. http://www.deeplearningbook.org.

S. Lloyd, "Least squares quantization in pcm," IEEE transactions on information theory, vol. 28, No. 2, pp. 129-137, 1982.

A. Mnih et al., "A scalable hierarchical distributed language model," in Advances in Neural Information Processing Systems, vol. 21, pp. 1081-1088, 2009.

A. Vaswani, et al., "Attention is all you need," in Advances in Neural Information Processing Systems 30, pp. 5994-6004, 2017.

(56) References Cited

OTHER PUBLICATIONS

Y. Kim, et al., "Character-aware neural language models.," in AAAI, pp. 2741-2749, 2016.
D. P. Kingma et al., "Auto-encoding variational bayes," International Conference on Learning Representations, 2014, 14 pages.
D. J. Rezende, et al., "Stochastic backpropagation and approximate inference in deep generative models," International Conference on Machine Learning, 2014, 14 pages.
S. Han, et al., "Ese: Efficient speech recognition engine with sparse lstm on fpga.," in FPGA, pp. 75-84, 2017.
L. A. Barroso, et al., "Web search for a planet: The google cluster architecture," IEEE Micro, vol. 23, pp. 22-28, 2003.
T. Sherwood, et al., "Automatically characterizing large scale program behavior," Proceedings of the 10th International Conference on Architectural Support for Programming Languages and Operating Systems, pp. 45-57, 2002.
C.-K. Luk, et al., "Pin: Building customized program analysis tools with dynamic instrumentation," in Proceedings of the 2005 ACM SIGPLAN Conference on Programming Language Design and Implementation, pp. 190-200, 2005.
M. Abadi, et al., "Tensorflow: Large-scale machine learning on heterogeneous distributed systems," arXiv preprint arXiv:1603.04467, 2016, 19 pages.
D. Kingma et al., "Adam: A method for stochastic optimization," International Conference on Learning Representations, 2015, 15 pages.
J. Duchi, et al., "Adaptive subgradient methods for online learning and stochastic optimization," Journal of Machine Learning Research, vol. 12, No. Jul, pp. 2121-2159, 2011.
D. Sanchez et al., "Zsim: Fast and accurate microarchitectural simulation of thousand-core systems," Proceedings of the 40th Annual International Symposium on Computer Architecture, ISCA '13, pp. 475-486, 2013.
T. Mikolov, et al. "Recurrent neural network based language model.," in Interspeech, vol. 2, 4 pages, 2010.
J. D. Gindele, "Buffer block prefetching method," IBM Technical Disclosure Bulletin, vol. 20, pp. 696-697, Jul. 1977.
TW Office Action in Taiwan Application No. 108119029, dated Mar. 16, 2020, 11 pages (with English translation).
PCT International Search Report in International Application No. PCT/US2019/034578, mailed Sep. 20, 2019, 13 pages.
Hashemi et al., "Learning Memory Access Patterns", arXiv, Mar. 2018, 15 pages.
Peled et al,, "Towards memory prefetching with neural networks: challenges and insights", arXiv, Mar. 2018, 13 pages.
Zeng et al, "Long short term memory based hardware prefetcher: a case study", Proceedings of the International Symposium on Memory Systems, Oct. 2017, 7 pages.
PCT International Preliminary Report in International Application No. PCT/US2019/034578, dated Dec. 10, 2020, 7 pages.
Shuishuai, "Embedded processor instruction prefetching Key technology design studies," Thesis for Post-Graduate Degree, Zhejiang University, Department of Information and Electronic Engineering, Jan. 10, 2010, 143 pages (with Machine translation).
Office Action in Chinese Application No. 201980026107.4, mailed on Dec. 21, 2023, 21 pages (with English translation).

\* cited by examiner

Instruction 401: load contents of mem1 into R1 (PC)
Instruction 402: load contents of mem2 into R2 (PC+1)
Instruction 403: add R1 to R2 and store in R1 (PC+2)
Instruction 404: load contents of mem3 into R2 (PC+3)
Instruction 405: add R1 to R2 and store in R1 (PC+4)
Instruction 406: load contents of mem4 into R2 (PC+5)
Instruction 407: add R1 to R2 and store in R1 (PC+6)
Instruction 408: store R1 in mem1 (PC+7)

COMPUTER SYSTEM PREDICTION MACHINE LEARNING MODELS

BACKGROUND

This specification relates to technologies for pre-fetching data from memory using neural networks.

Data pre-fetchers utilize hardware and/or software to predict future memory addresses from which data will be fetched based on a past history of memory accesses.

Neural networks are machine learning models that employ multiple layers of operations to predict one or more outputs from one or more inputs. Neural networks typically include one or more hidden layers situated between an input layer and an output layer. The output of each layer is used as input to another layer, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

Each layer generates one or more outputs using the current values of a set of parameters for the layer. Training the network thus involves continually performing a forward pass on the input, computing gradient values, and updating the current values of the set of parameters for each layer. Once a neural network is trained, the final set of parameters can be used to make predictions in a production system.

SUMMARY

This specification relates to technologies for pre-fetching data from memory using neural networks.

A system for pre-fetching data from memory receives a sequence of prior program counter addresses of a computer program and corresponding delta values. Each delta value defines a difference between a respective first memory address and a respective second memory address. The first memory address is a memory address that was accessed when an instruction pointed to by the corresponding program counter address was executed. The second memory address is a memory address that was accessed prior to the first memory address being accessed. For example, the second memory address can be a memory address that was accessed immediately prior, or it can be a memory address that was accessed several or more memory operations prior.

The system then converts the sequence of program counter addresses to an input representation. The system provides the input representation as input to a recurrent neural network. In some implementation, the input representation is a sequence of numeric embeddings in a high dimensional embedding space. In other implementations, the input representation is a set of program counter address and delta value pairs that are "k-means clustered."

The system receives from the recurrent neural network an output that defines a probability distribution over future delta values. Each probability in the distribution represents a likelihood that execution of a future instruction of the computer program will cause data to be fetched from a future memory address equal to: (i) a respective first memory address that was accessed when an instruction pointed to by a most recent program counter address in the sequence was executed plus (ii) the future delta value corresponding to the probability.

The subject matter described in this specification can be implemented in particular embodiments so as to realize one or more of the following advantages. The described system can more accurately predict future memory addresses from which data will be fetched by using a recurrent neural network to recognize long-term dependencies in a sequence of program counter addresses and corresponding delta values. The system can pre-fetch data from the future memory addresses that it predicts and store that data in local cache. Accurate pre-fetching reduces the number of cache misses in a computing system. Because fetching data from local cache is faster than fetching data from main memory, the run time of computer programs executing on the computing system is reduced. By using a recurrent neural network as described in this specification, the system can recognize even complex and irregular memory access patterns and therefore reduce the run time of computer programs even when conventional pre-fetching approaches would fail to cause significant improvement.

Reducing the number of cache misses also reduces the energy consumption of the computing system, because fetching data from main memory is energy-intensive as compared to fetching data from local cache.

The recurrent neural network can be trained offline. In other words, the recurrent neural network can be trained prior to being implemented in a computing system. After being implemented in the computing system, the parameters of the recurrent neural network remain static. Offline training is advantageous because it separates the computation overhead associated with training from the computation overhead associated with running the computer program itself. This further reduces the run time of the computer program.

The recurrent neural network can be configured to receive and predict deltas rather than memory addresses. A delta is a difference between two memory addresses. Deltas are easier to predict than memory addresses because physical address spaces are very large and sparse. On the other hand, the number of deltas in a given computer program is more confined. Once the system predicts a delta, it can calculate a future memory address associated with that delta through simple subtraction. Predicting deltas and calculating future memory addresses from those deltas is more accurate than predicting future memory addresses directly. Consequently, the described system can more accurately pre-fetch data from main memory, which reduces the run time of computer programs on the computing system.

Inputs to the recurrent neural network can also be clustered. The advantage of clustering program counter address and delta value pairs is that memory access patterns within clusters are more predictable than memory access patterns across an entire set of program counter addresses and delta values. So clustering inputs increases the prediction accuracy of the described system, which further reduces the run time of computer programs executing on the computing system.

Finally, the recurrent neural network can predict multiple future memory addresses from which data might be fetched at the next time step. Each prediction is made with a particular confidence. The described system can pre-fetch data from all future memory addresses that meet a predetermined threshold confidence. Doing so increases the likelihood that the correct data is pre-fetched. Once again, this reduces the run time of computer programs executing on the computing system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A computer program causes a computing system to operate on data stored in various memory locations in the computing system. Generally, the computing system must load data from other locations into local registers before it can operate on that data. The computing system can load data, for example, from local cache or main memory. Loading data from main memory is particularly slow because, generally, main memory is large and physically far from the local registers. So computer programs that routinely cause computing systems to fetch data from main memory execute more slowly than they would otherwise. By pre-fetching data from main memory and storing it in faster local cache before it is needed, computing systems can reduce the run time of computer programs.

Data pre-fetchers utilize hardware and/or software to predict future memory addresses from which data will fetched based on a past history of memory accesses. This specification in particular relates to technologies for pre-fetching data from memory using neural networks.

Figure 1:
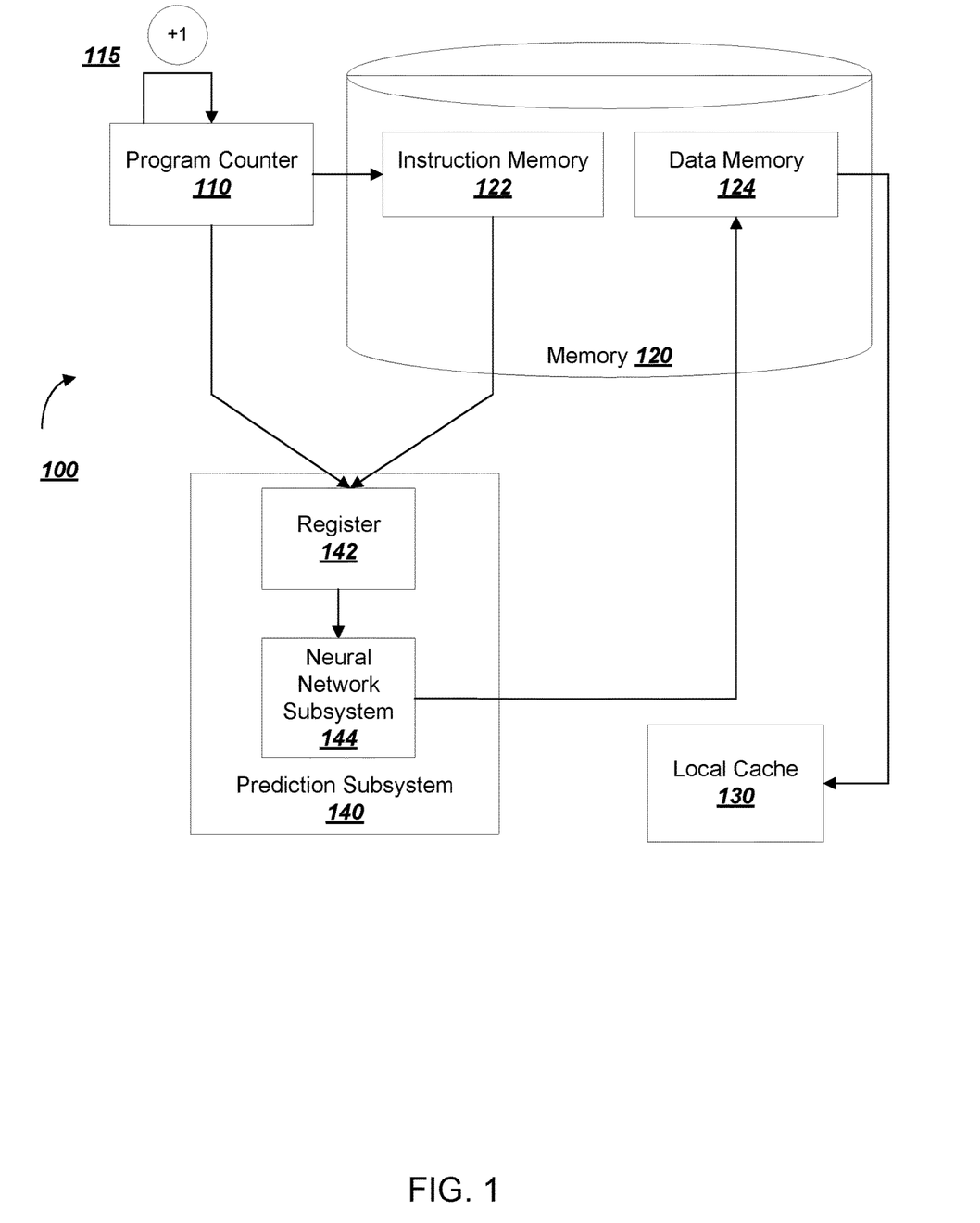
FIG. 1 is a diagram of an example system for pre-fetching data from memory.

FIG. 1 is a diagram of an example computing system 100.

The computing system 100 runs a computer program by executing computer program instructions of the computer program using one or more processors. In particular, the computing system 100 stores the computer program instructions in instruction memory and then executes the instructions in an order defined by the computer program.

The computing system 100 has a program counter 110. A program counter, i.e., an instruction address register, is a register that stores a value that "points to" the next computer program instruction to be executed. In other words, the program counter 110 stores an address where the next computer program instruction to be executed is located. Because computer program instructions are usually stored in sequential locations in memory, the program counter 110 includes a digital counter 115 that increments the address stored in the program counter 110 each time a new instruction is executed.

In some cases, computing system 100 does not execute the computer program in the same order in which they are stored in memory. For example, a particular group of machine code instructions might correspond to a conditional statement such as an "if-then-else" statement or a function call. If the condition associated with the conditional statement is met, the computing system executes one instruction sequence. If the condition associated with the conditional statement is not met, the computing system executes a different instruction sequence. If the current instruction sequence is different than the instruction sequence after the conditional statement, the computing system 100 must write a new value into the register of program counter 110. The new value is the address where the first instruction in the new sequence of instructions is located.

When an instruction cycle begins, the computing system 100 fetches the next computer program instruction from the address specified by program counter 110. The address that is stored in the program counter 110 corresponds to a location in instruction memory 122, which is a block of memory in memory 120. In some implementations, memory 120 is volatile memory such as static random access memory (SRAM) or dynamic random access memory (DRAM). In another implementation, memory 120 is non-volatile memory such as read-only memory (ROM), flash memory, or magnetic memory. In yet another implementation, memory 120 is some combination of volatile and non-volatile memory.

Typically, a given computer program instruction specifies an operation, e.g., load, store, add, subtract, nor, branch, etc., one or more source registers, and a destination register. The computing system 100 performs the specified operation on the data stored in the source registers and stores the result in the destination register. For example, a computer program instruction might specify that data stored in register A should be added to data stored in register B and that the result should be stored in register C.

The source registers are usually of limited size, so data to be operated on must generally be stored in memory and loaded into the source registers only when it is needed. But fetching data from memory is time-consuming and slows execution of computer programs. One solution to this problem is predicting data that will be operated on in the future, pre-fetching that data, and storing it in faster local memory such as a local cache 130. Fetching data from local cache is faster than fetching data from main memory because local cache is in general both physically closer to the system than main memory and smaller than main memory. Because local cache is smaller than main memory, the computing system can store only a small subset of main memory in local cache at any given time. Consequently, computing system 100 can predict a subset of memory addresses from which data will be fetched in the future and store that data in local cache. If the computing system makes accurate predictions, the computing system can execute the computer program instructions faster.

A prediction subsystem 140 of the computing system 100 is configured to predict data that the computing system 100 will operate on in the future. After the prediction subsystem 140 predicts a particular memory address from which data might be fetched in the future, the computing system 100 pre-fetches that data from main memory and stores it in the local cache 130. The prediction subsystem 140 continues to predict memory addresses—and the computing system 100 continues to pre-fetch data from those memory addresses—as the computer program is executed.

In some implementations, the prediction subsystem 140 is implemented in hardware directly on the computing system 100. In other implementations, the prediction subsystem 140 is implemented on one or more computers residing in other locations, or in software, i.e., as one or more computer programs on the computing system 100.

In some implementations, a register 142 receives and stores sequences of program counter addresses and corresponding memory addresses from the program counter 110 and instruction memory 122, respectively. The memory addresses are memory addresses that were accessed when instructions pointed to by their corresponding program counter addresses were executed. For example, a particular memory address might be a memory address from which data was fetched when a load instruction was executed.

In other implementations, the register 142 receives and stores sequences of program counter addresses and corresponding delta values. Each delta value in the sequence defines a difference between a respective first memory address and a respective second memory address. The first memory address is a memory address that was accessed when an instruction pointed to by the corresponding program counter address was executed, while the second memory address is a memory address that was accessed prior to the first memory address being accessed. For example, the first and second memory addresses might be memory addresses that were accessed when consecutive load instructions were executed. The first and second memory addresses can also be memory addresses that were accessed when non-consecutive load instructions were executed. If consecutive memory addresses are used to compute deltas, the system predicts future memory addresses that will be accessed at a time N+1. If non-consecutive memory addresses are used to compute deltas, the system does not predict the very next memory address that will be accessed. Instead, it predicts farther in the future. For example, if a first memory access and a fifth memory access are used to compute deltas, the system will predict the future memory addresses that will be accessed at a time N+4. In some implementations, the first and second memory addresses are addresses specifying locations in data memory 124.

In the implementations in which the register 142 stores program counter addresses and corresponding memory addresses, the prediction subsystem 140 calculates delta values through subtraction of consecutive memory addresses.

The prediction subsystem 140 includes a neural network subsystem 144. The neural network subsystem 144 can be implemented on the same computer on which the computer program is executed, or it can be implemented on a different computer.

The neural network subsystem 144 receives a sequence of program counter addresses and corresponding delta values. The neural network subsystem 144 processes the sequence of program counter addresses and corresponding delta values to predict memory addresses from which data will be fetched in the future as a result of execution of the computer program. The neural network subsystem 144 repeatedly generates these predictions as it receives new program counter address and delta value pairs.

In response to the repeated predictions generated by the neural network subsystem 144, the computing system 100 repeatedly pre-fetches data from data memory 124. The predictions specify memory addresses in data memory 124 from which to fetch the data. The computing system 100 then stores the data in the local cache 130. It is faster to fetch data from the local cache 130 than it is to fetch data from data memory 124. This results in faster execution of computer programs by the computing system 100.

Although this specification primarily describes pre-fetching data from memory, the technologies described herein can be applied to other types of predictive decision making in computing systems. For example, the technologies described herein can be used to pre-fetch instructions from instruction memory.

The systems and methods described in this application can also be used to optimize memory disambiguation. Memory disambiguation is a set of techniques employed by computing systems that execute memory access instructions out of order. The techniques detect or predict dependencies between memory operations to increase memory access efficiency and speed.

The technologies described herein can also be used to optimize cache replacement policies. Because cache is of limited size, when a computing system places data into cache, it must generally remove a corresponding amount of data from the cache. The systems and methods described in this application can predict the best data, e.g., the data least likely to be used by the computing system in the near future, to remove from the cache. Alternatively, the systems and methods can predict the data most likely to be used in the near future and ensure that that data remains in the cache. For example, in a "least recently used" cache, i.e., a cache that has a replacement policy that specifies that the least recently used data in the cache should be removed in favor of new data, the systems and methods described herein can update an "age bit" for data that is predicted to be used in the near future. Updating the age bit ensures that the data will not be replaced with new data.

Figure 2:
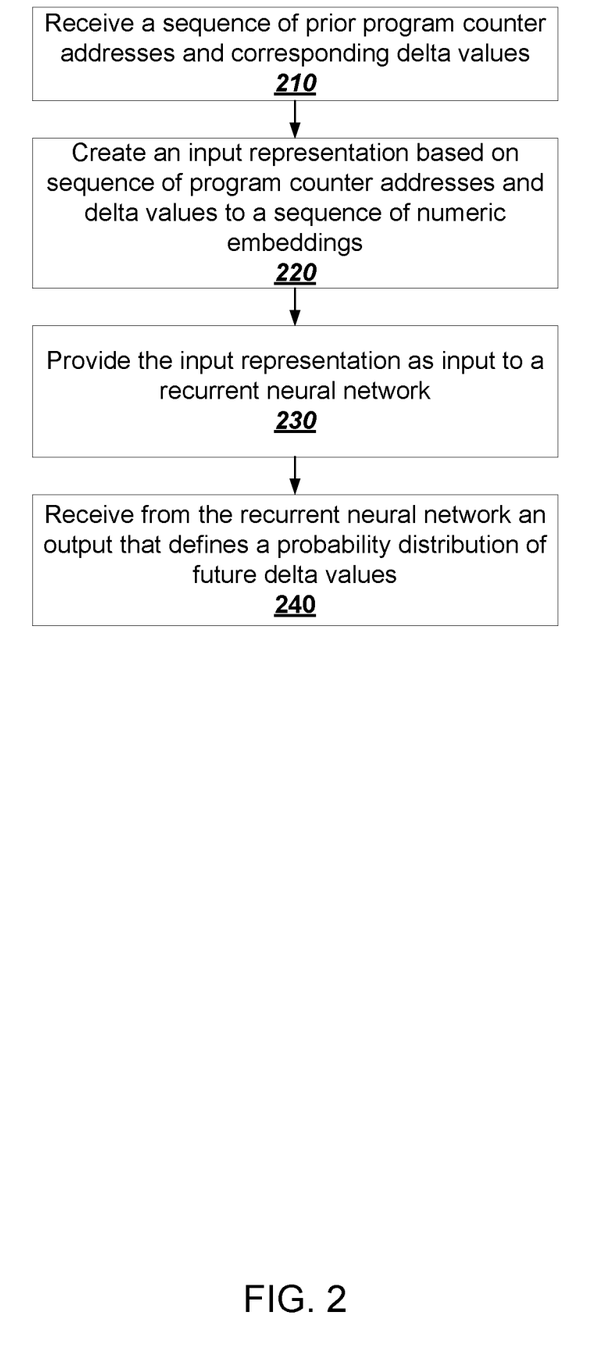
FIG. 2 is a flow chart of an example process for pre-fetching data from memory.

FIG. 2 is a flow chart of an example process 200 for pre-fetching data from memory. For convenience, the process 200 will be described as being performed by a system of one or more computers located in one or more locations. For example, a neural network subsystem, e.g., the neural network subsystem 144 of FIG. 1, appropriately programmed, can perform the process 200.

First, the system obtains a sequence of prior program counter addresses of a computer program and corresponding delta values (210). As described above in reference to FIG. 1, program counter addresses are addresses that point to computer program instructions to be executed. Those computer program instructions are usually stored in instruction memory. Meanwhile, each delta value defines a difference between a respective first memory address and a respective second memory address. The first memory address is a memory address that was accessed when an instruction pointed to by its corresponding program counter address was executed. For example, a particular program counter address might point to a memory address storing an instruction that, when executed, fetches data from memory. The memory address of that data is the first memory address. The second memory address is a memory address that was accessed prior to the first memory address being accessed.

In some implementations, the system receives the sequence of prior program counter addresses and corresponding delta values. In other implementations, the system receives only a sequence of prior program counter addresses and corresponding memory addresses. In such a case, the system calculates the delta values subtracting adjacent memory addresses in the received sequence.

Next, the system creates an input representation based on the sequence of program counter addresses and their corresponding delta values (220).

In some implementations, the system creates the input representation by mapping the sequence of program counter addressed and their corresponding delta values to a sequence of numeric embeddings in a high dimensional space. The embeddings are high-dimensional, real-valued vectors. In some implementations, the embeddings for a program counter address and corresponding delta value are each 128-dimensional. The system can concatenate the embeddings form a 256-dimensional embedding. In other implementations, the embeddings for a program counter address and corresponding delta value are each 64-dimensional, 256-dimensional, or 512-dimensional.

The embeddings represent points in a high dimensional space. Embeddings that are "close" to each other in the space are associated with computer program instructions that fetch data from similar memory regions. For example, two different program counter addresses might be very different in raw value, but may correspond to one function that regularly calls another function. In such a case, the program counter addresses might have similar embeddings.

In some implementations, the system generates the sequence of embeddings using a lookup table generated by a trained neural network. In other implementations, the system generates the embeddings by providing the sequence of program counter addresses and delta values directly to the trained neural network. Other input representations will be described in more detail in reference to FIG. 3.

Next, the system provides the sequence of numeric embeddings as input to a recurrent neural network (230). Neural networks are machine learning models that employ one or more layers of nonlinear units to predict an output for a received input. Some neural networks include one or more hidden layers in addition to an output layer. The output of each hidden layer is used as input to the next layer, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. This allows the neural network to exhibit dynamic temporal behavior. In other words, the recurrent neural network summarizes all information it has received up to a current time step and is capable of capturing long-term dependencies in sequences of data.

In some implementations, the recurrent neural network is a long short-term memory (LSTM) neural network that includes two LSTM memory layers. Each LSTM layer includes multiple units. The first LSTM layer receives a multi-dimensional input representing a sequence of program counter addresses and corresponding delta values. At a first time step, the first LSTM layer receives an input representing an "oldest" program counter address and its corresponding delta value. In other words, it first receives an input representing a program counter address corresponding to a program instruction that was executed first in time. At a second time step, the first LSTM layer receives an input representing a program counter address corresponding to a program instruction that was executed second in time. At a third time step, the first LSTM layer receives an input representing a program counter address corresponding to a program instruction that was executed third in time. This pattern continues for all time steps.

The number of units in each LSTM layer corresponds to the number of dimensions in the multi-dimensional input.

The recurrent neural network also has a second LSTM layer. The units in the second LSTM layer receive input from the units in the first LSTM layer. This is analogous to having multiple layers in a feedforward neural network, and allows greater modeling flexibility with relatively fewer parameters.

The recurrent neural network is structured and trained in such a way that it can recognize long-term dependencies, e.g. patterns, in the sequence of inputs. Specifically, the recurrent neural network can recognize long-term dependencies in the sequence of program counter addresses and corresponding delta values to predict future memory addresses from which data will fetched.

Each LSTM unit in the recurrent neural network 300 includes a hidden state h, a cell state c, an input gate i, a forget gate f, and an output gate o. Each of the three gates can be thought of as individual neurons that compute activations of weighted sums. Intuitively, the input gate controls the extent to which a new value flows into the cell, the forget gate controls the extent to which a value remains in the cell and the output gate controls the extent to which the value in the cell is used to compute the output activation of the LSTM unit. In other words, these gates control what the LSTM unit "remembers," or how its state is influenced by previous states.

The final layer in the recurrent neural network is a soft-max layer. The soft-max layer has a number of neurons that receive input from the second LSTM layer. The soft-max layer processes its input to generate a probability distribution of outputs representing future delta values.

In some cases, the neural network model directly outputs a probability distribution over delta values. In other cases, the neural network model outputs a probability distribution over indices. The indices must then be converted to delta values in much the same way that delta values are mapped to embeddings.

The recurrent neural network learns offline through supervised learning. In other words, the recurrent neural network can be trained prior to being implemented in a computing system whose pre-fetching the neural network will control. After being implemented in the computing system, the parameters of the recurrent neural network remain static. Offline training is advantageous because it separates the computation overhead associated with training from the computation overhead associated with running the computer program itself. This reduces the runtime of the computer program.

Generally, training data for a neural network includes a set of inputs and labels for those inputs. The labels correspond to desired or expected outputs to be generated for the corresponding input. For example, the labels can include actual delta values that are observed when a computing system executes a computer program.

The system trains the neural network to accurately predict outputs by determining trained values of the weights of the neural network. More specifically, the system trains the neural network to set the weights of the neural network to minimize the discrepancy between the actual neural network output and the desired or expected output for a given set of inputs. The measure of discrepancy is known as a loss function.

In some cases, the loss function for the training is the cross-entropy function, i.e., the log loss function. Given the probability distribution of outputs generated by the soft-max layer, the negative log-probability that the neural network generates the correct output can be calculated.

If the cross-entropy function indicates an error between the output generated by the recurrent neural network and the desired or expected output for a given set of inputs, the weights of the recurrent neural network can be updated, e.g., using a conventional backpropagation through time training technique. Other techniques known in the art and other loss functions can also be used to update the weights of the recurrent neural network.

As described above, the system receives from the recurrent neural network an output that defines a probability distribution of future delta values (240). The system can restrict the set of possible delta values to the most commonly occurring delta values in order to keep the recurrent neural network fast. For example, the system can restrict the set of possible delta values to the 50,000 most commonly occurring delta values.

Each probability in the distribution represents a likelihood that execution of a future instruction of the computer program will cause data to be fetched from a future memory address equal to (i) a respective first memory address that was accessed when an instruction pointed to by a most recent program counter address in the sequence was executed plus (ii) the future delta value corresponding to the probability. The computer program is the same computer program associated with the program counter addresses.

In some implementations, the system can set a threshold criterion and determine if any of the probabilities in the distribution meet that threshold criterion. For example, the threshold criterion can be a probability of 0.5, i.e., a 50% chance that a particular future memory address will be accessed when a future instruction of the computer program is executed. The system can adjust the threshold criterion dynamically. For example, the system can set a higher threshold when memory bandwidth utilization is high and set a lower threshold when the memory bandwidth utilization is low. In some implementations, the system can set a higher threshold when it is more accurately predicting future memory addresses.

In response to determining that a particular probability in the probability distribution does meet the threshold criterion, the system can fetch data from the memory address associated with that probability and store that data in a local cache.

In some implementations, the system may determine that multiple probabilities meet the threshold criterion and pre-fetch data from the multiple memory addresses associated with those probabilities. Doing so increases the likelihood that the correct data is pre-fetched. This reduces the run time of the computer program executing on the computing system.

The system is usually configured to predict memory addresses that will be accessed at time step N+1, i.e., memory addresses that be accessed when the next computer program instruction is executed. However, it is possible to train the recurrent neural network to predict further time steps ahead. For example, the recurrent neural network can be trained to predict a memory address that will be accessed at N+2, N+4, or N+8. The recurrent neural network can be trained to predict memory addresses that will be accessed at N+2, for example, by providing to the recurrent neural network deltas that are calculated using second memory addresses that were accessed at N−2.

In another implementation, instead of pre-fetching data as described above, the system can insert a fetch instruction into the computer program. Execution of the fetch instruction causes data to be fetched from a future memory address associated with a probability that meets the threshold criterion. The fetch instruction must be inserted into the computer program prior to the future instruction of the computer program that would otherwise cause the data to be fetched from memory. In this way, the data that the future instruction needs will already be in local cache when the future instruction is executed. Execution of the future instruction will then result in a cache hit instead of a cache miss, and the system will not need to fetch data from memory. This makes the computer program run faster, since fetching data from memory is time-intensive.

More than one fetch instruction can be inserted into the computer program if more than one probability meets the threshold criterion.

In some implementations, the system provides additional features to the recurrent neural network. For example, the system can provide an indication of whether the most recent memory access was a load or a store. The system can also provide to the recurrent neural network the current cache occupancy. The current cache occupancy can affect the threshold criterion as described above.

Figure 3:
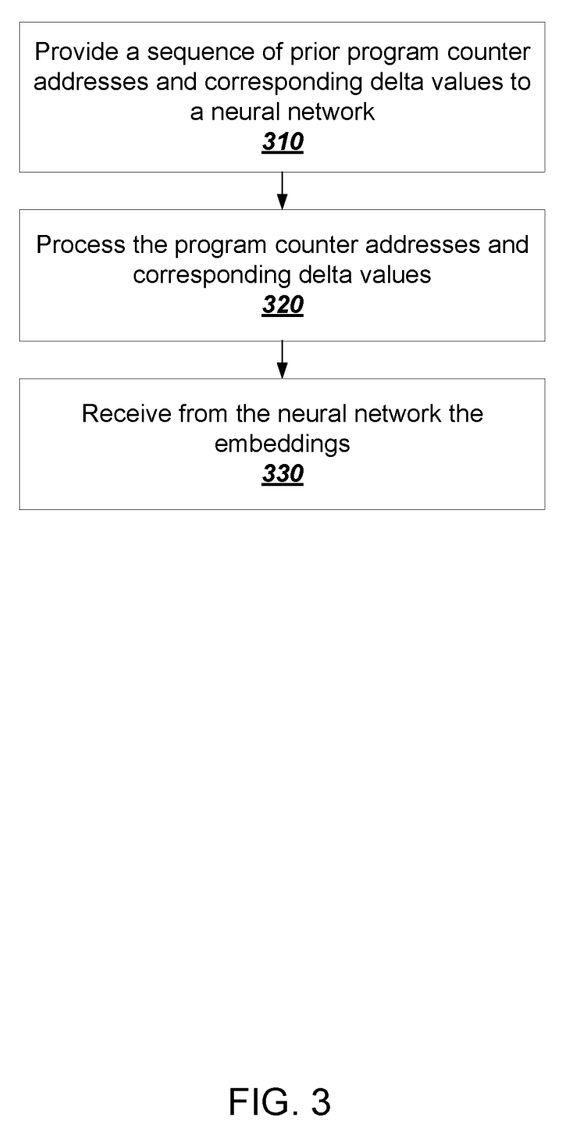
FIG. 3 is a flow chart of an example process for generating high-dimensional embeddings from a sequence of prior program counter addresses and their corresponding delta value.

FIG. 3 is a flow chart of an example process for generating the high-dimensional embeddings from the sequence of prior program counter addresses and their corresponding delta value. For convenience, the process 300 will be described as being performed by a system of one or more computers located in one or more locations. For example, a neural network subsystem, e.g., the neural network subsystem 144 of FIG. 1, appropriately programmed, can perform the process 300.

First, the sequence of prior program counter addresses and their corresponding delta values are provided to a neural network (310). For convenience and clarity, this neural network will be referred to as the embedding neural network. The embedding neural network can precede and be connected to the recurrent neural network 300 described in reference to FIG. 3. In an implementation in which the embedding neural network is connected to the recurrent neural network 300, the two neural networks are trained end-to-end. In other words, training inputs, i.e., sequences of prior program counter addresses and corresponding delta values are provided to the embedding neural network. Then, the combined neural networks process the inputs to generate outputs, which are compared to desired or expected outputs as described above. If there is any discrepancy, that discrepancy is used to update the parameters of the two neural networks through stochastic gradient descent with backpropagation. The parameters of the recurrent neural network 300 are updated first, followed by the parameters of the embedding neural network, i.e., by backpropagating gradients from the recurrent neural network into the embedding neural network.

Through training, the embedding neural network learns parameters that result in similar program counter address and delta value pairs having similar embeddings. In other words, two embeddings that are close to each other, in a geometric sense, in the high dimensional embedding space, should be programmatically similar. For example, two different program counter addresses might each correspond to a function that regularly calls another. In such a case, the two program counter addresses might correspond to high dimensional embeddings that are geometrically close to one another. As another example, two embeddings might also be similar if their delta values each correspond to memory addresses storing data in a particular linked-list or a particular array.

Next, the embedding neural network processes the sequence of program counter addresses and their corresponding delta values (320).

Finally, the system receives as output from the embedding neural network a sequence of numeric embeddings in a high dimensional embedding space (330). The embeddings are high-dimensional, real-valued vectors.

In some implementations, once the embedding neural network is trained, it can be represented by a simple look-up table. Program counter address and delta value pairs can be mapped to indices, and the indices can be used to lookup embeddings in the lookup table. Such a representation is possible because the embedding neural network is static after it is trained. In other words, once it is trained, the embedding neural network will always output the same high-dimensional embedding given a particular input, i.e., a particular program counter address and delta value pair.

The sequence of prior program counter addresses and delta values can be represented in other ways.

In some implementations, the sequence of prior program counter addresses and delta values can be "k-means clustered."

K-means clustering is a method of vector quantization that aims to partition n observations, e.g., program counter address and delta value pairs, into k clusters in which each observation belongs to the cluster with the nearest mean, or centroid, serving as a prototype of the cluster. This results in a partitioning of the data space. As a preliminary matter, the program counter address and delta value pairs must be represented as points or vectors in a space so that system can calculate distances between the points. As described in reference to FIG. 3, the program counter address and delta value pairs can be mapped to high dimensional embeddings in a high dimensional embedding space. In some implementations, the program counter address can represent an x-coordinate, while the delta value can represent a y-coordinate.

First, the system must select k, the number of clusters. K is an important parameter that can affect the quality of the input representation. The system can select an appropriate value for K through trial and error. Next, the system must select arbitrary means, or centroids, for each of the k clusters. Then, the system calculates the distance from each observation, e.g., each point representing a program counter address and delta value pair, to each centroid. Each point is then allocated to the cluster with the centroid nearest to it. Finally, new centroids are calculated based on the new set of points in each cluster. This process is repeated until no points are allocated to new clusters.

Each of the program counter address and delta value pairs can then be represented as a distance to the centroid of its cluster. These distances can be normalized and be used as input to the recurrent neural network 300. For a more detailed discussion of k-means clustering, see, for example, MacQueen, J. Some methods for classification and analysis of multivariate observations. Proceedings of the Fifth Berkeley Symposium on Mathematical Statistics and Probability, Volume 1: Statistics, 281-297, University of California Press, Berkeley, Calif., 1967.

The advantage of clustering program counter address and delta value pairs is that data fetch patterns within clusters are much more predictable that data fetch patterns across the entire set of program counter addresses and delta values.

In other implementations, the sequence of program counter addresses and corresponding delta values are represented as binary strings. The recurrent neural network 300 can learn patterns of bit flips. Different bits can be weighted more or less heavily in order to account for the fact that incorrectly predicting bit 31 of a future memory address would result in a large miss, while incorrectly predicting bit 0 of a future memory address would result in a small miss.

Figure 4:
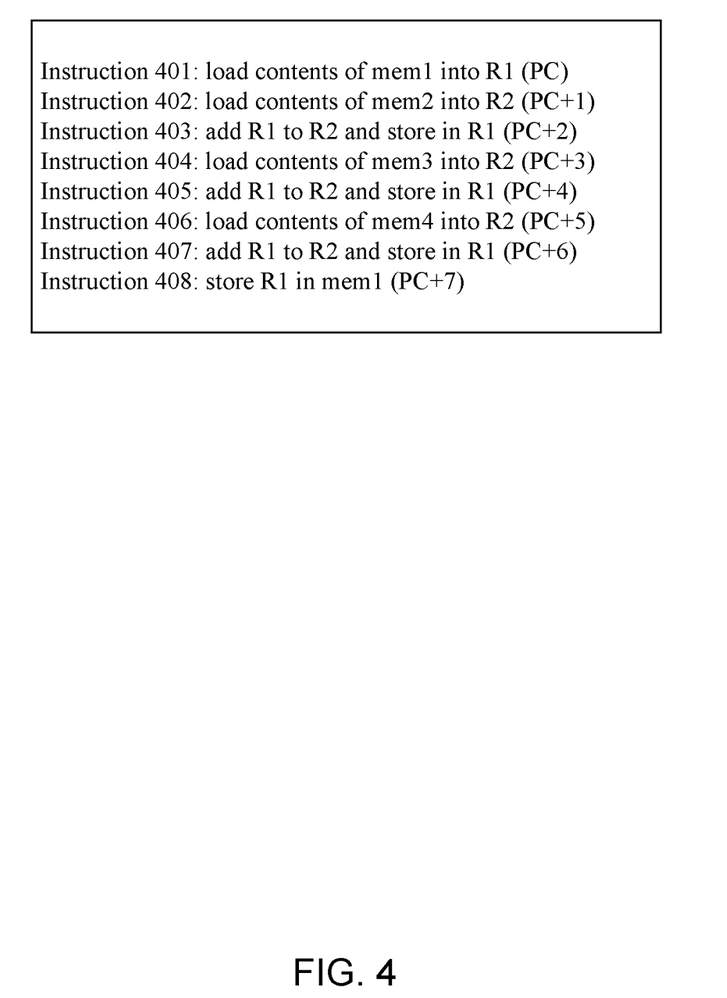
FIG. 4 depicts an example computer program.

FIG. 4 depicts an example computer program 400. The computer program 400 is written in a fictitious assembly language. Assembly languages are low-level programming languages for computers or other programmable devices. In contrast to high-level programming languages, e.g., C++, Java, Python, Ruby, and others, assembly languages are specific to particular computer architectures. High-level programming language instructions are converted to assembly language instructions by compilers. Assembly language instructions closely correspond to machine language instructions.

Assembly language instructions generally specify an opcode, i.e., the operation to be performed; source registers, i.e., the registers that store the data to be operated on; and a destination register, i.e., the register in which the result of the operation should be stored. Assembly language operations include load, store, add, subtract, nor, compare, branch, jump, and others.

Load operations move data from memory to a register. Store operations move data from a register to memory. Add, subtract, nor, and compare operations are arithmetic and logical operations performed on the data stored in the specified source registers. And compare, branch, and jump operations correspond to conditional statements and function calls in high-level programming languages.

The computer program 400 executes on a processor with two registers, R1 and R2, and four memory addresses, mem1, mem2, mem3, and mem4. The computer program 400 computes the sum of the values stored in the four memory addresses.

First, in instructions 401 and 402, the values stored in mem1 and mem2 are loaded into R1 and R2, respectively. In instruction 403, R1 is added to R2 and stored in R1. After instruction 403, R1 stores the sum of (1) the value stored in mem1 and (2) the value stored in mem2.

In instruction 404, the value stored in mem3 is loaded into R2. In instruction 405, R1 is again added to R2 and stored in R1. After instruction 405, R1 stores the sum of (1) the value stored in mem1, (2) the value stored in mem2, and (3) the value stored in mem3.

In instruction 406, the value stored in mem4 is loaded into R2. In instruction 407, R1 is again added to R2 and stored in R1. After instruction 407, R1 stores the sum of (1) the value stored in mem1, (2) the value stored in mem2, (3) the value stored in mem3, and (4) the value stored in mem4. Finally, in instruction 408, R1 is stored in mem1, overwriting the previous value stored in mem1.

The computer program 400 has four load instructions: instruction 401, instruction 402, instruction 404, and instruction 406. Each of those four instructions has a program counter address and corresponding delta value that can be provided to a system for predicting future memory addresses.

The program counter address for instruction 401 is PC. The corresponding delta value is merely mem1, because there were no memory address accesses prior to instruction 401. The program counter address for instruction 402 is PC+1. The corresponding delta value is mem1−mem2. The program counter address for instruction 404 is PC+3. The corresponding delta value is mem3−mem2. Finally, the program counter address for instruction 406 is PC+5. The corresponding delta value is mem4−mem3. The four program counter address and delta value pairs can be provided as input to a prediction system, e.g., the prediction subsystem 140 of FIG. 1.

Figure 5:
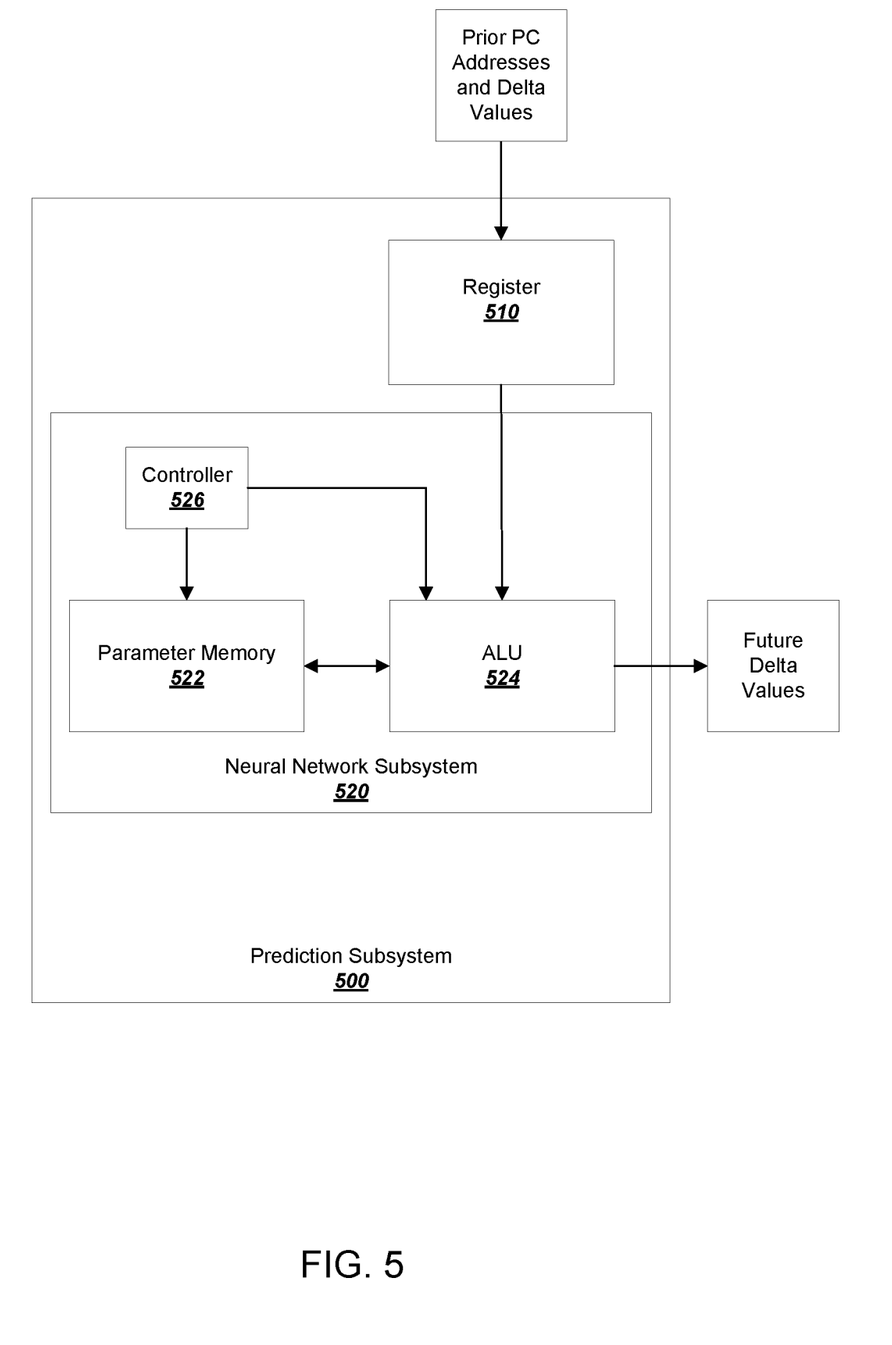
FIG. 5 depicts an example prediction subsystem for predicting future memory addresses.

FIG. 5 depicts an example prediction subsystem 500 for predicting future memory addresses from which data will likely be fetched. The prediction subsystem 500 is implemented directly in hardware in the computing system in which the pre-fetching occurs.

The register 510 receives and stores sequences of prior program counter addresses and corresponding delta values.

A neural network subsystem 520 of the prediction subsystem 500 has parameter memory 522, an arithmetic logic unit (ALU) 524, and a controller 526. The parameter memory 522 stores the parameters of a long short-term memory (LSTM) network, which is one type of recurrent neural network. For example, the parameter memory 522 stores the input, forget, output, and cell weights of each LSTM layer of the LSTM network. The parameter memory 522 also stores the biases of each layer and the cell states and hidden states of each LSTM cell in each LSTM layer. In some implementations, the parameter memory 522 is volatile memory such as static random access memory (SRAM) or dynamic random access memory (DRAM). In other implementations, the parameter memory 522 is non-volatile memory such as read-only memory (ROM), flash memory, or magnetic memory. In other implementations, the parameter memory 522 is some combination of volatile and non-volatile memory. For example, the weights of each LSTM layer, which do not change after the LSTM network is trained, can be stored in non-volatile memory, while the cell state and hidden state of each LSTM unit, which change frequently, can be stored in volatile memory.

The ALU 524 computes the input, forget, and output gates of each LSTM unit. It also computes the cell state and hidden state of each LSTM unit. An ALU is a combinational circuit that performs arithmetic and bitwise operations on binary numbers. The inputs to an ALU are the data to be operated on, called operands, and an opcode indicating the operation to be performed. The ALU's output is the result of the performed operation. The controller 526 controls the inputs that the ALU 524 receives from the parameter memory 522. It also controls the operation that the ALU 524 performs.

The ALU 524 receives as input the parameters stored in the parameter memory 522 and the sequence of program counter addresses and corresponding delta values stored in register 510. The ALU 524 calculates the outputs of each LSTM unit. For example, the ALU 524 computes the input, forget, output, and hidden gates of each LSTM cell.

The controller 526 can cause the ALU 524 to write computed cell and hidden states to the parameter memory 522 so that those cell and hidden states can be used to compute outputs at a next time time-step.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

receiving a sequence of prior program counter addresses of a computer program and corresponding delta values, wherein each delta value defines a difference between a respective first memory address and a respective second memory address, wherein the respective first memory address is a memory address that was accessed when an instruction pointed to by a corresponding prior program counter address of the sequence of prior program counter addresses was executed, and wherein the respective second memory address is a memory address that was accessed prior to the respective first memory address being accessed;

generating an input representation based on the sequence of prior program counter addresses and their corresponding delta values, the generating comprising:

generating, for each prior program counter address, a first numeric embedding using a lookup table generated by a trained neural network, wherein the first numeric embedding is a real-valued vector in a high dimensional embedding space;

generating, for each corresponding delta value, a second numeric embedding using the lookup table generated by the trained neural network, wherein the second numeric embedding is a real-valued vector in the high dimensional embedding space;

combining, for each prior program counter address and each corresponding delta value, the first embedding and the second embedding to generate a combined numeric embedding, wherein the input representation includes a sequence of the combined numeric embeddings;

providing the input representation including the sequence of the combined numeric embeddings in the high dimensional embedding space that are mapped from the sequence of prior program counter addresses and their corresponding delta values as input to a recurrent neural network; and receiving from the recurrent neural network an output that defines a probability distribution of future delta values, wherein each probability in the probability distribution represents a likelihood that execution of a future instruction of the computer program will cause data to be fetched from a future memory address equal to (i) a respective first memory address that was accessed when an instruction pointed to by a most recent program counter address in the sequence was executed plus (ii) a future delta value corresponding to the probability.

2. The method of claim 1, further comprising: determining that one or more probabilities in the probability distribution meet a threshold criterion.

3. The method of claim 2, further comprising:
in response to determining that the one or more probabilities in the probability distribution meet the threshold criterion, fetching data from one or more future memory addresses associated with the one or more probabilities that meet the threshold criterion; and
storing the data in local cache.

4. The method of claim 2, further comprising:
automatically inserting one or more fetch instructions into the computer program, wherein execution of the one or more fetch instructions causes data to be fetched from one or more future memory addresses associated with the one or more probabilities meeting the threshold criterion, and wherein the one or more fetch instructions are inserted into the computer program prior to future instructions of the computer program.

5. The method of claim 1, further comprising:
comparing memory addresses from which data is fetched as a result of execution of future instructions of the computer program to the probability distribution of future delta values; and
updating parameters of the recurrent neural network based on the comparison.

6. The method of claim 1, wherein operations of the method are performed on a microprocessor, wherein the recurrent neural network is implemented on the microprocessor, and wherein the method further comprises:
fetching data from one or more future memory addresses associated with one or more probabilities in the probability distribution that meet a threshold criterion; and
storing the data in local cache on the microprocessor.

7. The method of claim 1, wherein mapping the sequence of prior program counter addresses and their corresponding delta values to the combined numeric embeddings in a high dimensional embedding space comprises:
using a pre-specified vocabulary to map the sequence of prior program counter addresses and their corresponding delta values to indices; and
using the indices to retrieve corresponding embeddings from a lookup table.

8. The method of claim 1, further comprising:
partitioning the sequence of the combined numerical embeddings into a plurality of clusters, wherein each cluster has a centroid point;
normalizing each combined numerical embedding with respect to the centroid point of a corresponding cluster; and
providing the normalized numerical embeddings as input to the recurrent neural network.

9. The method of claim 1, further comprising:
determining that a memory address associated with a probability that meets a threshold criterion should be accessed in an order different than an order in which a corresponding future instruction of the computer program appears; and
changing the order of the corresponding future instruction of the computer program.

10. The method of claim 2, further comprising:
determining that data from a memory address associated with a probability that meets the threshold criterion is present in local cache, and
updating an age bit for the data in local cache, wherein the age bit indicates how recently the data has been used, and wherein the local cache is a least recently used local cache.

11. A system comprising one or more computers and one or storage devices storing instructions that, when executed by the one or more computers, cause the one or more computers to perform operations comprising:
receiving a sequence of prior program counter addresses of a computer program and corresponding delta values, wherein each delta value defines a difference between a respective first memory address and a respective second memory address, wherein the respective first memory address is a memory address that was accessed when an instruction pointed to by a corresponding prior program counter address of the sequence of prior program counter addresses was executed, and wherein the respective second memory address is a memory address that was accessed prior to the respective first memory address being accessed;
generating an input representation based on the sequence of prior program counter addresses and their corresponding delta values, the generating comprising:
generating, for each prior program counter address, a first numeric embedding using a lookup table generated by a trained neural network, wherein the first numeric embedding is a real-valued vector in a high dimensional embedding space;
generating, for each corresponding delta value, a second numeric embedding using the lookup table generated by the trained neural network, wherein the second numeric embedding is a real-valued vector in the high dimensional embedding space;
combining, for each prior program counter address and each corresponding delta value, the first embedding and the second embedding to generate a combined numeric embedding, wherein the input representation includes a sequence of the combined numeric embeddings;
providing the input representation including the sequence of the combined numeric embeddings in the high dimensional embedding space that are mapped from the sequence of prior program counter addresses and their corresponding delta values as input to a recurrent neural network; and
receiving from the recurrent neural network an output that defines a probability distribution of future delta values, wherein each probability in the probability distribution represents a likelihood that execution of a future instruction of the computer program will cause data to be fetched from a future memory address equal to (i) a respective first memory address that was accessed when an instruction pointed to by a most recent program counter address in the sequence was executed plus (ii) a future delta value corresponding to the probability.

12. The system of claim 11, wherein the operations further comprise: determining that one or more probabilities in the probability distribution meet a threshold criterion.

13. The system of claim 12, wherein the operations further comprise:
in response to determining that the one or more probabilities in the probability distribution meet the threshold criterion, fetching data from one or more future memory addresses associated with the one or more probabilities that meet the threshold criterion; and
storing the data in local cache.

14. The system of claim 12, wherein the operations further comprise:
automatically inserting one or more fetch instructions into the computer program, wherein execution of the one or more fetch instructions causes data to be fetched from one or more future memory addresses associated with the one or more probabilities meeting the threshold criterion, and wherein the one or more fetch instructions are inserted into the computer program prior to future instructions of the computer program.

15. The system of claim 11, wherein the operations further comprise:
comparing memory addresses from which data is fetched as a result of execution of future instructions of the computer program to the probability distribution of future delta values; and
updating parameters of the recurrent neural network based on the comparison.

16. The system of claim 11, wherein the operations are performed on a microprocessor, wherein the recurrent neural network is implemented on the microprocessor, and wherein the operations further comprises:
fetching data from one or more future memory addresses associated with one or more probabilities in the probability distribution that meet a threshold criterion; and
storing the data in local cache on the microprocessor.

17. The system of claim 11, wherein mapping the sequence of prior program counter addresses and their corresponding delta values to the combined numeric embeddings in a high dimensional embedding space comprises:
using a pre-specified vocabulary to map the sequence of prior program counter addresses and their corresponding delta values to indices; and
using the indices to retrieve corresponding embeddings from a lookup table.

18. One or more non-transitory computer storage media encoded with instructions that, when executed by one or more computers, cause the one or more computers to perform operations comprising:
receiving a sequence of prior program counter addresses of a computer program and corresponding delta values, wherein each delta value defines a difference between a respective first memory address and a respective second memory address, wherein the respective first memory address is a memory address that was accessed when an instruction pointed to by a corresponding prior program counter address of the sequence of prior program counter addresses was executed, and wherein the respective second memory address is a memory address that was accessed prior to the respective first memory address being accessed;
generating an input representation based on the sequence of prior program counter addresses and their corresponding delta values, the generating comprising:
generating, for each prior program counter address, a first numeric embedding using a lookup table generated by a trained neural network, wherein the first numeric embedding is a real-valued vector in a high dimensional embedding space;
generating, for each corresponding delta value, a second numeric embedding using the lookup table generated by the trained neural network, wherein the second numeric embedding is a real-valued vector in the high dimensional embedding space;
combining, for each prior program counter address and each corresponding delta value, the first embedding and the second embedding to generate a combined numeric embedding, wherein the input representation includes a sequence of the combined numeric embeddings;
providing the input representation including the sequence of the combined numeric embeddings in the high dimensional embedding space that are mapped from the sequence of prior program counter addresses and their corresponding delta values as input to a recurrent neural network; and
receiving from the recurrent neural network an output that defines a probability distribution of future delta values, wherein each probability in the probability distribution represents a likelihood that execution of a future instruction of the computer program will cause data to be fetched from a future memory address equal to (i) a respective first memory address that was accessed when an instruction pointed to by a most recent program counter address in the sequence was executed plus (ii) a future delta value corresponding to the probability.

19. The one or more non-transitory computer storage media of claim 18, wherein the operations further comprise: determining that one or more probabilities in the probability distribution meet a threshold criterion.

20. The one or more non-transitory computer storage media of claim 19, wherein the operations further comprise:
in response to determining that the one or more probabilities in the probability distribution meet the threshold criterion, fetching data from one or more future memory addresses associated with the one or more probabilities that meet the threshold criterion; and
storing the data in local cache.

* * * * *